(12) United States Patent
Seo et al.

(10) Patent No.: US 8,982,771 B2
(45) Date of Patent: *Mar. 17, 2015

(54) METHOD FOR PERFORMING HARQ FOR RELAY STATION

(71) Applicant: LG Electronics Inc., Seoul (KR)

(72) Inventors: Hanbyul Seo, Seoul (KR); Byoung-Hoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 38 days.

This patent is subject to a terminal disclaimer.

(21) Appl. No.: 13/941,803

(22) Filed: Jul. 15, 2013

(65) Prior Publication Data

US 2013/0343260 A1 Dec. 26, 2013

Related U.S. Application Data

(63) Continuation of application No. 12/920,584, filed as application No. PCT/KR2009/006961 on Nov. 25, 2009, now Pat. No. 8,514,766.

(60) Provisional application No. 61/119,380, filed on Dec. 3, 2008.

(30) Foreign Application Priority Data

Mar. 17, 2009 (KR) .................. 10-2009-0022797

(51) Int. Cl.
*H04B 7/14* (2006.01)
*H04W 24/02* (2009.01)
*H04L 1/18* (2006.01)
*H04L 1/00* (2006.01)

(52) U.S. Cl.
CPC ............. *H04W 24/02* (2013.01); *H04L 1/1854* (2013.01); *H04L 1/1887* (2013.01); *H04L 1/1812* (2013.01); *H04L 2001/0097* (2013.01)
USPC ............................ 370/315; 370/293; 370/458

(58) Field of Classification Search
None
See application file for complete search history.

(56) References Cited

U.S. PATENT DOCUMENTS

| | | | |
|---|---|---|---|
| 5,699,367 | A | 12/1997 | Haartsen |
| 8,171,366 | B2 | 5/2012 | Suga |
| 2003/0108031 | A1 | 6/2003 | Inden |
| 2004/0010736 | A1 | 1/2004 | Alapuranen |

(Continued)

FOREIGN PATENT DOCUMENTS

WO 2006-024321 3/2006

*Primary Examiner* — Ian N Moore
*Assistant Examiner* — Phong La
(74) *Attorney, Agent, or Firm* — Lee, Hong, Degerman, Kang & Waimey

(57) ABSTRACT

A method for performing HARQ includes: receiving information to determine downlink subframes used for a relay station to receive scheduling information from a BS; determining uplink subframes for performing a HARQ with the DL subframes, each of the UL subframes corresponding to each of the DL subframes; assigning sequentially each of a plurality of HARQ processes to each of the UL subframes one by one; and performing HARQ with the BS at at least one of the HARQ processes. An n-th subframe is configured for a corresponding UL subframe if an (n−4)-th subframe is configured for one of the DL subframes, n denoting an integer. The HARQ processes are equal in number to the UL subframes. The DL subframes are configured in at least one radio frame having 10 subframes indexed from 0 to 9. Subframes having indexes 0, 4, 5 and 9 are not configured as a DL subframe.

6 Claims, 15 Drawing Sheets

(56) References Cited

U.S. PATENT DOCUMENTS

| | | |
|---|---|---|
| 2005/0088990 A1 | 4/2005 | Gibbons et al. |
| 2006/0195767 A1 | 8/2006 | Ihm et al. |
| 2007/0275656 A1 | 11/2007 | Chang et al. |
| 2009/0185521 A1 | 7/2009 | Li et al. |
| 2009/0217119 A1 | 8/2009 | Zhang et al. |
| 2010/0080139 A1* | 4/2010 | Palanki et al. ............ 370/252 |
| 2010/0080166 A1 | 4/2010 | Palanki et al. |
| 2010/0091708 A1 | 4/2010 | Nishikawa et al. |
| 2010/0097978 A1 | 4/2010 | Palanki et al. |
| 2010/0103860 A1 | 4/2010 | Kim et al. |
| 2010/0135235 A1* | 6/2010 | Ji et al. ............ 370/329 |
| 2010/0315989 A1* | 12/2010 | Reznik et al. ............ 370/315 |
| 2011/0128893 A1 | 6/2011 | Park et al. |
| 2011/0305134 A1 | 12/2011 | Chung et al. |
| 2012/0033588 A1 | 2/2012 | Chung et al. |

* cited by examiner

FIG. 8
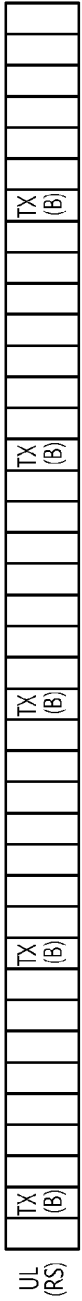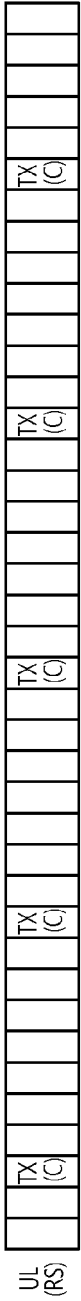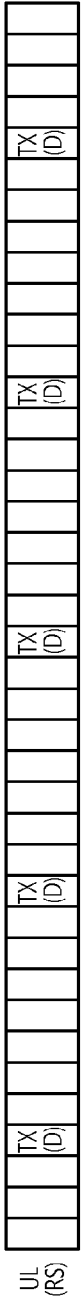

FIG. 9
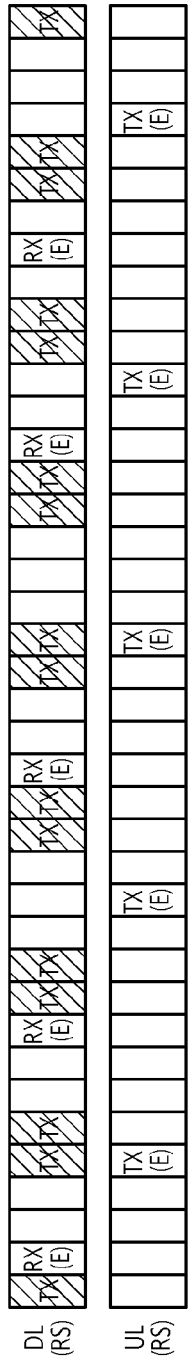
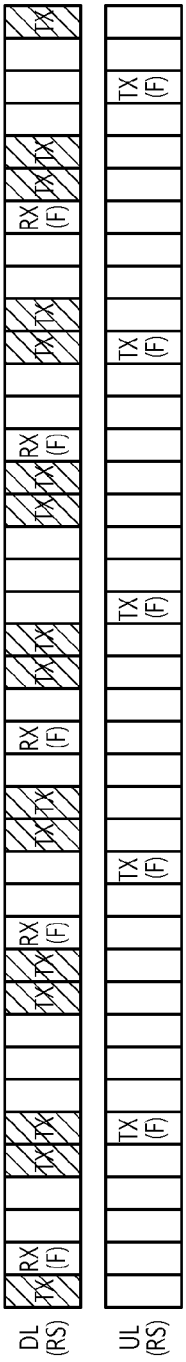
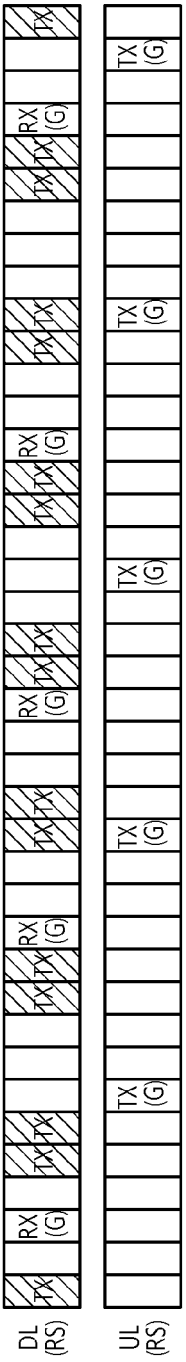
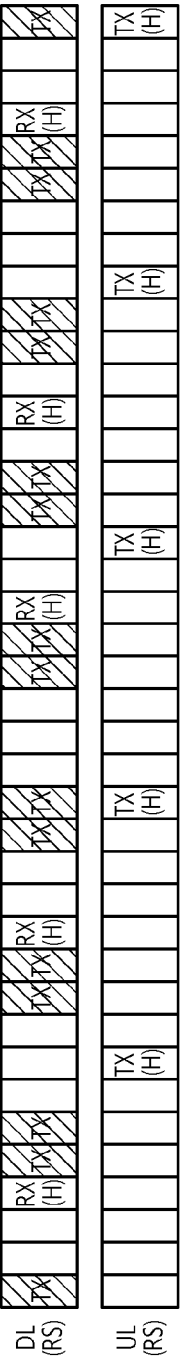

FIG. 11

METHOD FOR PERFORMING HARQ FOR RELAY STATION

CROSS-REFERENCE TO RELATED APPLICATIONS

This application is a continuation of U.S. patent application Ser. No. 12/920,584, filed on Sep. 1, 2010, now U.S. Pat. No. 8,514,766, which is the National Stage filing under 35 U.S.C. 371 of International Application No. PCT/KR2009/006961, filed on Nov. 25, 2009, which claims the benefit of earlier filing date and right of priority to Korean Patent Application No. 10-2009-0022797, filed on Mar. 17, 2009, and also claims the benefit of U.S. Provisional Application No. 61/119,380, filed on Dec. 3, 2008, the contents of which are all hereby incorporated by reference herein in their entirety.

TECHNICAL FIELD

The present invention relates to wireless communication and, more particularly, to a method for performing HARQ for a relay station.

BACKGROUND ART

An error compensation technique for ensuring reliability of communication includes a forward error correction (FEC) scheme and an automatic repeat request (ARQ) scheme. In the FEC scheme, an error at a reception end is corrected by adding an extra error correction code to information bits. In the ARQ scheme, an error is corrected through data retransmission, for which there are a stop and wait (SAW) scheme, a go-back-N (GBN) scheme, a selective repeat (SR) scheme, and the like. The SAW scheme is a scheme in which whether or not a transmitted frame has been properly received is checked and then a next frame is transmitted. The GBN scheme is a scheme in which N number of successive frames are transmitted, and if a successful transmission is not made, every transmitted frame subsequent to an error-generated frame is retransmitted. The SR scheme is a scheme in which only an error-generated frame is selectively re-transmitted.

The FEC scheme is advantageous in that a time delay is small and there is no need to transmit and receive information between a transmission end and a reception end, but a system efficiency is degraded in a good channel environment. The ARQ scheme has a high transmission reliability but is disadvantageous in that a time delay occurs and a system efficiency is degraded in a poor channel environment. A hybrid automatic repeat request (HARQ) scheme combining the FEC and ARQ has been proposed to resolve such shortcomings. According to the HARQ scheme, whether or not data received by a physical layer has an error that cannot be decoded is checked, and if the data has an error, retransmission of data is requested to thus enhance performance.

The receiver of the HARQ scheme basically attempts an error correction on received data and determines whether or not data retransmission is required by using an error detection code. As the error detection code, a cyclic redundancy check (CRC) may be used. When an error of reception data is detected through the CRC detection process, the receiver transmits the NACK signal to the transmitter. Upon receiving the NACK signal, the transmitter transmits proper retransmission data according to the HARQ mode. Upon receiving the retransmission data, the receiver combines the previous data and the retransmission data and decodes the same to thereby improve reception performance.

The retransmission scheme of the HARQ may be classified into a synchronous scheme and an asynchronous scheme. In the synchronous HARQ, data is retransmitted at a point of time both the transmitter and the receiver knows about, so signaling required for transmission of data such as an HARQ processor number or the like can be reduced. In the asynchronous HARQ, resources are allocated at an arbitrary time for retransmission. The asynchronous HARQ provides flexibility of resource allocation.

Meanwhile, the wireless communication system may include a relay station (RS) in addition to a base station (BS) and a mobile terminal (MS). The RS serves to extend a cell coverage and improve a transmission performance. When the BS provides a service to an MS located outside the coverage of the BS via the RS, the RS may relay both control signals and data signal between the corresponding MS and the BS, thus extending the cell coverage of the BS. In addition, when the BS provides a service to an MS located within the coverage of the BS via the RS, the RS may amplify a data signal between the BS and the MS and transfer the amplified signal to each reception end, to thereby improve a transmission performance. The presence of RS is required especially when an MS is in a shadow area within the coverage of the BS.

When the RS is disposed between the BS and the MS, performing HARQ is problematic. The reason is because HARQ generally considers only a one-to-one situation between the BS and the MS, so the presence of RS requires consideration of HARQ between the RS and the BS and HARQ between the RS and the MS. In particular, if the synchronous HARQ is performed between the BS and the MS in the conventional wireless communication system, how to perform HARQ of the RS without affecting the synchronous HARQ matters.

DISCLOSURE OF INVENTION

Technical Problem

An object of the present invention is to provide a method for performing HARQ for a relay station.

Another object of the present invention is to provide a relay station that performs HARQ.

Solution to Problem

In an aspect, a method for performing a hybrid automatic repeat request (HARQ) by a relay station (RS) in a wireless communication system is provided. The method includes performing HARQ with a mobile station(MS) by a fixed HARQ period, and performing HARQ with a base station (BS) by a HARQ period series, wherein the HARQ period series comprises a plurality of HARQ period series element $(x_k, y_k)$, where $(x_k, y_k)$ indicates that when data is transmitted in n-th subframe, an ACK/NACK signal is received in $(n+x_k)$-th subframe and the data is retransmitted in $(n+x_k+y_k)$-th subframe when the ACK/NACK signal is a NACK signal, wherein at least one of $x_k$ and $y_k$ for one HARQ period in the HARQ period series is different from at least one of $x_k$ and $y_k$ for the other HARQ period in the HARQ period series.

The sum of $x_k$ and $y_k$ for each HARQ period in the HARQ period series may be same.

The sum of $x_k$ and $y_k$ for each HARQ period in the HARQ period series may be eight.

The HARQ period series may comprise HARQ period series elements (6, 2), (4, 4), (5, 3), (4, 4) and (4, 4).

The HARQ period series may comprise HARQ period series elements (4, 4), (4, 4), (5, 3), (4, 4) and (4, 4).

The fixed HARQ period may be equal to an HARQ period in which the RS performs HARQ with a mobile station (MS).

The fixed HARQ period may be an interval of 8 subframes.

The HARQ periods in the HARQ period series may cyclically be shifted.

In another aspect, a relay station (RS) includes a transceiver configured to transmit or receive a radio signal, and a processor connected with the transceiver and performing hybrid automatic repeat request (HARQ), wherein the processor performs HARQ with a MS by a fixed HARQ period and performs HARQ with a BS by a HARQ period series, wherein the HARQ period series comprises a plurality of HARQ period series element $(x_k, y_k)$, where $(x_k, y_k)$ indicates that when data is transmitted in n-th subframe, an ACK/NACK signal is received in $(n+x_k)$-th subframe and the data is retransmitted in $(n+x_k+y_k)$-th subframe when the ACK/NACK signal is a NACK signal, wherein at least one of $x_k$ and $y_k$ for one HARQ period in the HARQ period series is different from at least one of $x_k$ and $y_k$ for the other HARQ period in the HARQ period series.

Advantageous Effects of Invention

The method for performing HARQ between a relay station and a base station or between a relay station and a mobile terminal is provided. Even if a blank frame is generated from the relay station, collision can be avoided. The relay station can perform HARQ while maintaining compatibility with an existing synchronous HARQ.

BRIEF DESCRIPTION OF DRAWINGS

FIG. 8 illustrates the types of HARQ processes defined in FIG. 7.

FIG. 9 illustrates the types of HARQ processes defined in FIG. 7.

FIG. 11 illustrates the types of HARQ processes defined in FIG. 10.

MODE FOR THE INVENTION

The following technique may be used for various wireless communication systems such as a code division multiple access (CDMA), a frequency division multiple access (FDMA), a time division multiple access (TDMA), an orthogonal frequency division multiple access (OFDMA), a single carrier-frequency division multiple access (SC-FDMA), and the like. The CDMA may be implemented by a radio technology such as universal terrestrial radio access (UTRA) or CDMA2000. The TDMA may be implemented by a radio technology such as a global system for mobile communications (GSM)/general packet radio service (GPRS)/enhanced data rates for GSM evolution (EDGE). The OFDMA may be implemented by radio technology such as IEEE (Institute of Electrical and Electronics Engineers) 802.11 (Wi-Fi), IEEE 802.16 (WiMAX), IEEE 802.20, E-UTRA (Evolved UTRA), and the like. The UTRA is a part of a universal mobile telecommunications system (UMTS). 3GPP ($3^{rd}$ Generation, Partnership Project) LTE (Long Term Evolution) is a part of an evolved UMTS (E-UMTS) using the E-UTRA, which adopts the OFDMA in downlink and the SC-FDMA in uplink.

For clarification, the following description will be centered on 3GPP LTE, but the technical idea of the present invention is not meant to be limited thereto.

Figure 1:
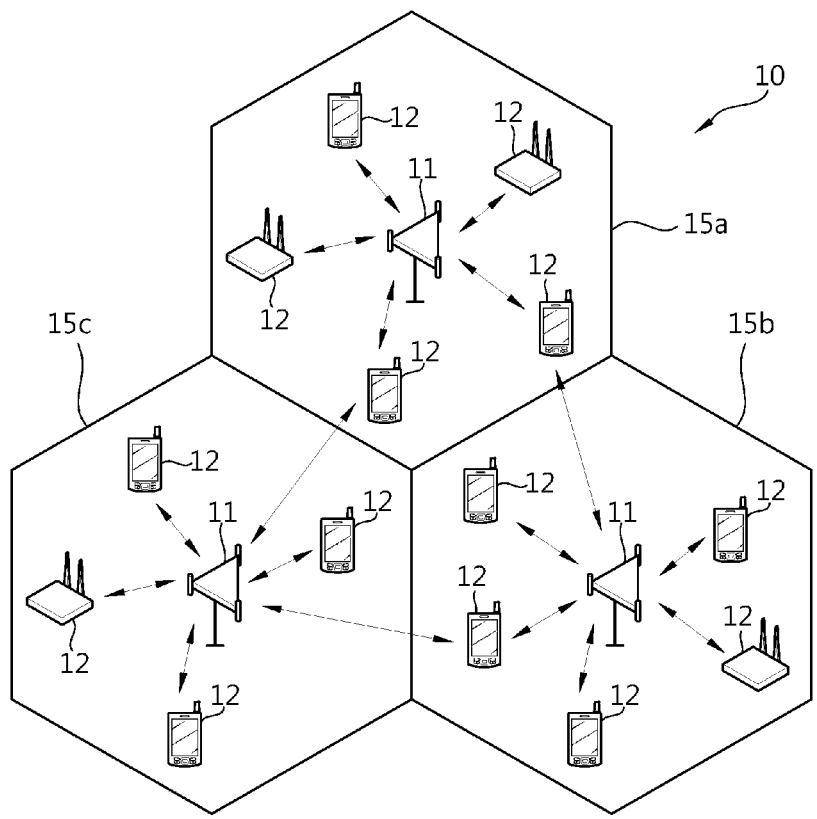
FIG. 1 illustrates a wireless communication system.

FIG. 1 illustrates a wireless communication system.

With reference to FIG. 1, the wireless communication system 10 includes at least one base station (BS) 11. Each BS 11 provides a communication service to particular geographical areas (which are generally called cells) 15a, 15b, and 15c. Each cell may be divided into a plurality of areas (which are called sectors). One or more cells may exist in a single BS.

A mobile station (MS) 12 may be fixed or mobile, and may be referred to by other names such as user equipment (UE), user terminal (UT), subscriber station (SS), wireless device, personal digital assistant (PDA), wireless modem, handheld device, access terminal (AT), etc. The BS 11 generally refers to a fixed station that communicates with the MS 12 and may be called by other names such as evolved-node B (eNB), base transceiver system (BTS), access point (AP), an access network (AN), etc.

Hereinbelow, downlink (DL) refers to communication from the BS 11 to the MS 12, and uplink (UL) refers to communication from the MS 12 to the BS 11. In the downlink, a transmitter may be a part of the BS 11 and a receiver may be a part of the MS 12. In the uplink, a transmitter may be a part of the MS 12 and a receiver may be a part of the BS 11.

Figure 2:
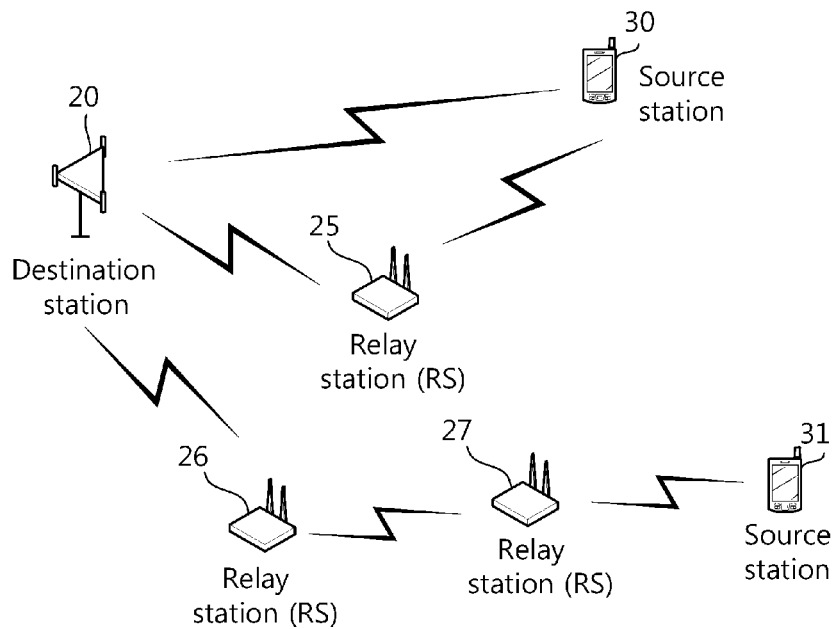
FIG. 2 illustrates a wireless communication system including relay stations.

FIG. 2 illustrates a wireless communication system using a relay station (RS). In uplink transmission, a source station may be the MS and a destination station may be the BS. In downlink transmission, a source station may be the BS and a destination station may be the MS. The RS may be the MS, or an extra independent RS may be disposed. The BS may perform functions such as connectivity between the RS and the MS, management, controlling, and resource allocation.

With reference to FIG. 2, a destination station 20 communicates with a source station 30 via a relay station 25. The source station 30 sends uplink data to the destination station 20 and to the relay station 25, and the relay station 25 retransmits the received data. The destination station 20 also communicates with the source station 31 via relay stations 26 and 27. In uplink transmission, the source station 31 sends uplink data to the destination station 20 and the relay stations 26 and 27, and the relay stations 26 and 27 retransmits the received data simultaneously or sequentially.

There are shown the single destination station 20, three relay stations 25, 26, and 27, and two source stations 30 and 31, but the present invention is not limited thereto. Namely, the number of destination stations, relay stations, and source stations included in the wireless communication system is not limited.

As a relay method used in the relay stations, any methods can be such as an amplify and forward (AM), a decode and forward (DF), or the like, and the technical idea of the present invention is not limited thereto.

The wireless communication system supports a hybrid automatic repeat request (HARQ). In downlink HARQ, the BS transmits downlink data to the MS, and the MS transmits an ACK/NACK (Acknowledgement/Negative-Acknowledgement) signal regarding whether or not the downlink data has been successfully received. When the downlink data is successfully decoded, the ACK/NACK signal is an ACK signal, whereas if decoding of the downlink data fails, the ACK/NACK signal is a NACK signal. In uplink HARQ, the MS transmits uplink data to the BS, and the BS transmits an ACK/NACK signal regarding whether or not the uplink data has been successfully received. HARQ can be divided into a synchronous HARQ and an asynchronous HARQ. The synchronous HARQ is a scheme in which data is transmitted at a point of time the BS and the MS knows about. The asynchronous HARQ is a scheme in which a data retransmission is made at an arbitrary time.

Figure 3:
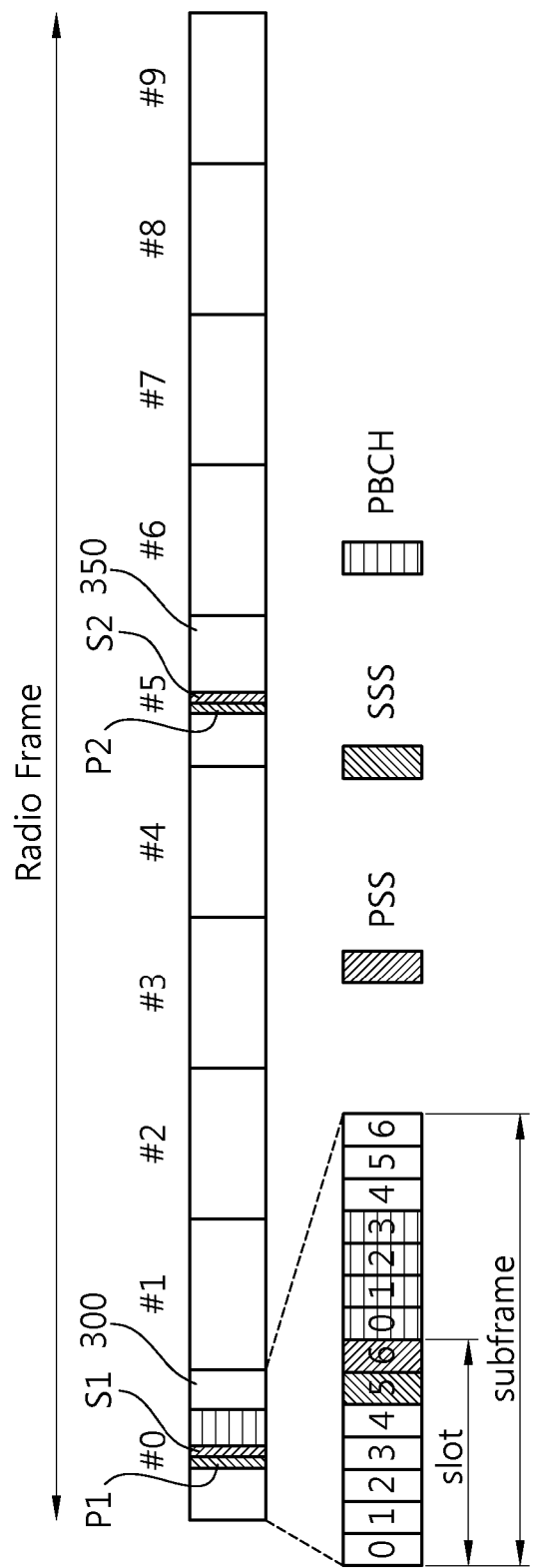
FIG. 3 illustrates a radio frame structure in a 3GPP ($3^{rd}$ Generation Partnership Project) LTE (Long Term Evolution).

FIG. 3 illustrates a radio frame structure in a 3GPP (3$^{rd}$ Generation Partnership Project) LTE (Long Term Evolution). It may refer to 3GPP TS 36.211 V8.3.0 (2008-05) 'Technical Specification Group Radio Access Network; Evolved Universal Terrestrial Radio Access (E-UTRA); Physical channels and modulation (Release 8)'.

With reference to FIG. 3, a radio frame may include ten subframes, and a single subframe may include two slots. A single slot may include a plurality of OFDM symbols in a time domain. A single slot includes seven OFDM symbols, but the number of OFDM symbols included in the single slot may vary according to a cyclic prefix (CP) structure.

The structure of the radio frame is merely illustrative, and the number of subframes included in the radio frame and the number of slots included in the subframes may vary.

Primary synchronization signals (PSSs) (P1 and P2) are positioned at the last OFDM symbol of the 0-th slot and the 10-th slot. The two PSSs (P1 and P2) use the same primary synchronization code (PSC). The PSS (P1 and P2) are used to obtain an OFDM symbol synchronization or slot synchronization. In the 3GPP LTE, three PSCs are used, and the BS selects one of the three PSCs according to a cell ID and transmits the PSSs (P1 and P2) through the last OFDM symbol of the 0-th slot and the 10-th slot.

Secondary synchronization signals (SSSs) (S1 and S2) are positioned at an immediately previous OFDM symbol of the last OFDM symbol of the 0-th slot and the 10-th slot. The SSSs (S1 and S2) and the PSSs (P1 and P2) may be positioned at the contiguous OFDM symbols. The SSSs (S1 and S2) are used to obtain frame synchronization. The SSSs (S1 and S2) use different SSCs (Secondary Synchronization Codes). Namely, the first SSS (S1) uses a first SSC, and the second SSS (S2) uses a second SSC.

A physical broadcast channel (PBCH) is allocated to 0-th to 3-rd OFDM symbols of the second slot. The PBCH is transmitted in units of 40 ms (namely, in units of four radio frames). The PBCH carries system information the MS requires for its connection with the BS at an early stage.

In the radio frame structure, the PSSs, the SSSs and the PBCHs are transmitted through a subframe #0 300 and a subframe #5 350. Thus, the subframe #0 300 and the subframe #5 350 are those for the MS or the RS to necessarily receive for their connection with the BS.

Figure 4:
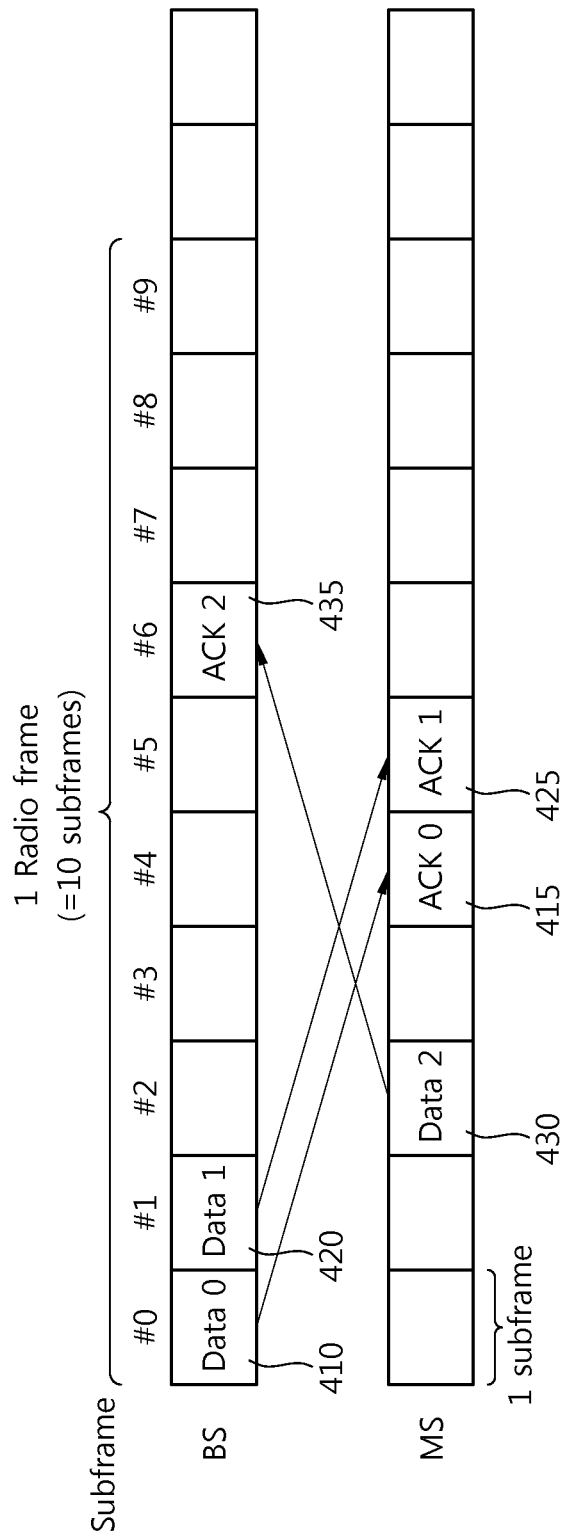
FIG. 4 illustrates an example of a synchronous ACK/NACK transmission scheme.

FIG. 4 illustrates the synchronous HARQ. In the 3GPP LTE, when data is received in n-th subframe, the ACK/NACK signal is transmitted in the (n+4)-th subframe.

With reference to FIG. 4, with respect to downlink Data 0 410 received in the subframe #0, the MS transmits an 'ACK/NACK 0' signal 415 to the BS in the subframe #4.

When the MS receives downlink 'DATA 1' 420 in the subframe #1, it may transmit an 'ACK/NACK 1' signal 425 in the subframe #5. In addition, when the BS receives uplink 'DATA 2' 430 in the subframe #2, it may transmit an 'ACK/NACK 2' signal 435 in the subframe #6.

It may be difficult to apply such synchronous HARQ to the RS as it is. In general, the RS cannot simultaneously perform data reception from the BS or data relay to the MS in a particular subframe. This is because a data transmission to the MS with respect to a data reception from the BS may work as interference. This is called a self-interference. Thus, in general, the RS cannot simultaneously perform data transmission and reception in the same frequency band. Likewise, the RS cannot relay data to the BS while it is receiving data from the MS.

Thus, in order to solve this problem, a blank subframe is proposed. The blank subframe refers to a subframe in which the RS does not transmit data to the BS or to the MS.

Some or the entirety of subframes may be set as blank subframes. Hereinafter, an entire single subframe is set as a blank subframe, but this is merely illustrative and the technical idea of the present invention can be applicable as it is to a case where only a part of a subframe is set blank which can be interpreted as a partial blank subframe.

In a case, a certain subframe within a radio frame cannot be designated as a blank subframe. For example, in the 3GPP LTE system, the PSS and the SSS are transmitted in the subframe #0 and the subframe #5 in the radio frame. In addition, generally, a paging message or the like is broadcast in the subframe #4 and/or the subframe #9. The subframes #0, #4, #5, and #9 are those for the MS to necessarily receive for its connection with the BS, so in these subframes, the RS cannot be operated in a data reception state and needs to be operated in a transmission state. Thus, the subframes #0, #4, #5, and #9 cannot be defined as blank subframes. These subframes are called non-blankable subframes. If there is a non-blankable subframe, how HARQ is to be performed between the RS and the BS and between the RS and the MS matters.

Figure 5:
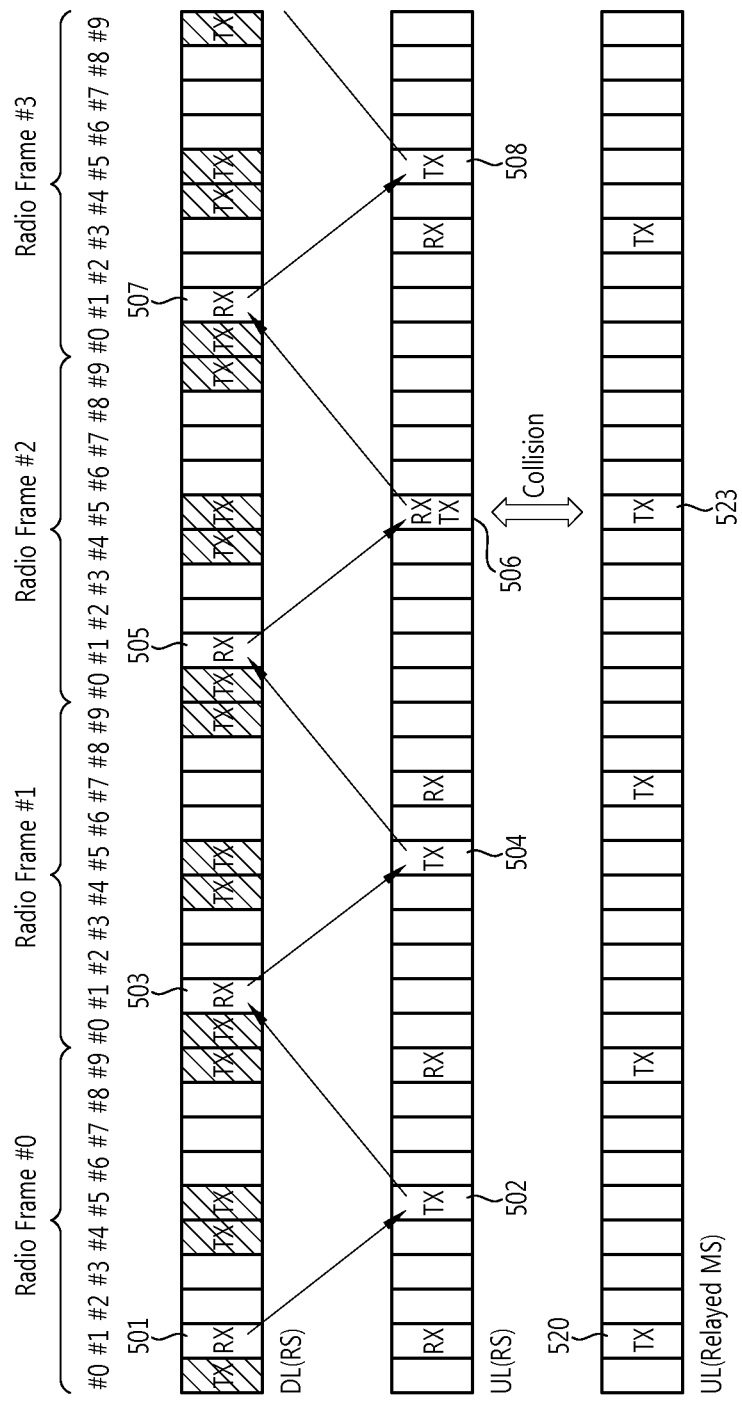
FIG. 5 illustrates performing of synchronous HARQ between a relay station and a base station when there is a non-blankable subframe.

FIG. 5 illustrates performing of synchronous HARQ between the RS and the BS when there is a non-blankable subframe, in which the shaded boxes represent the non-blankable subframes in which the RS is in a transmission state.

In FIG. 5, a DL (RS) indicates subframes of the RS at a downlink band, a UL (RS) indicates subframes of the RS at an uplink band, and a UL (Relayed MS) indicates subframes at an uplink band of the MS connected with the RS. In FIG. 5, TXs within the subframes indicate that data or the like is being transmitted in the corresponding subframes, and RXs within the subframes indicate that data is being received. Namely, in the subframes of the DL (RS), TXs indicate that the RS is transmitting data or the like to the MS at a downlink frequency band in the subframes concerned, and RXs indicate that the RS is receiving data or the like from the BS at the downlink frequency band. In the subframes of the UL (RS), TXs indicate that the RS is transmitting data or the like to the BS at an uplink frequency band in the subframes concerned, and RXs indicate that the RS is receiving data or the like from the MS at the uplink frequency band. In the subframes of the UL (Relayed MS), TXs indicate that the MS is transmitting data or the like to the RS at the uplink frequency band.

With reference to FIG. 5, the RS is in the transmission state (TXs) to the MS in the non-blankable subframes among the subframes belonging to the DL (RS). Here, the subframes #0, #4, #5, #9 are defined as the non-blankable subframes, but they are merely illustrative and the locations and number of the non-blankable subframes are not limited.

The RS receives a scheduling message from the BS in a subframe #1 501 of the radio frame #0. The scheduling message includes resource allocation information for the RS to transmit data to the BS. The RS transmits data according to the scheduling message in a subframe #5 502 of the radio frame #0. The RS receives an ACK/NACK signal with respect to the data from the BS in a subframe #1 503 of the radio frame #1. Here, the ACK/NACK signal is assumed to be a NACK signal. Then, the RS transmits retransmission data to the BS in a subframe #5 504 of the radio frame #1.

Subsequently, the RS receives a NACK signal with respect to the data from the BS in a subframe #1 505 of the radio frame #2. The RS transmits second retransmission data to the BS in a subframe #5 506 of the radio frame #2.

The RS receives a NACK signal with respect to the data from the BS in a subframe #1 507 of the radio frame #3. The RS transmits third retransmission data to the BS in a subframe #5 508 of the radio frame #3.

The period by which a next data transmission is made after a first data transmission is an interval of 10 subframes, which is called HARQ period. Here, in order to prevent reception of an ACK/NACK signal in the non-blankable subframes, HARQ period is set as the interval of 10 subframes. Meanwhile, synchronous HARQ may be performed between the MS and the RS. Here, the synchronous HARQ is performed by the interval of 8 subframes of the HARQ period. Namely, it is assumed that the MS transmits initial data to the RS in the subframe #1 520 of the radio frame #0. Then, the MS transmits first retransmission data in a subframe #9 of the radio frame #0, a next HARQ period.

When the HARQ process continues, the MS transmits third retransmission data to the RS in a subframe #5 523 of the radio frame #2. In this respect, however, because the RS is already transmitting the second retransmission data to the BS in the subframe 506, the RS cannot receive the third retransmission data from the MS. This is called a HARQ collision.

When HARQ is performed at the RS, the collision between the HARQ between the BS and the RS and the HARQ between the RS and the MS needs to be considered. In addition, the performance of the MS should not be affected whether or not RS is applied. Similarly HARQ performance of the MS should not be affected regardless of the application of the RS.

Figure 6:
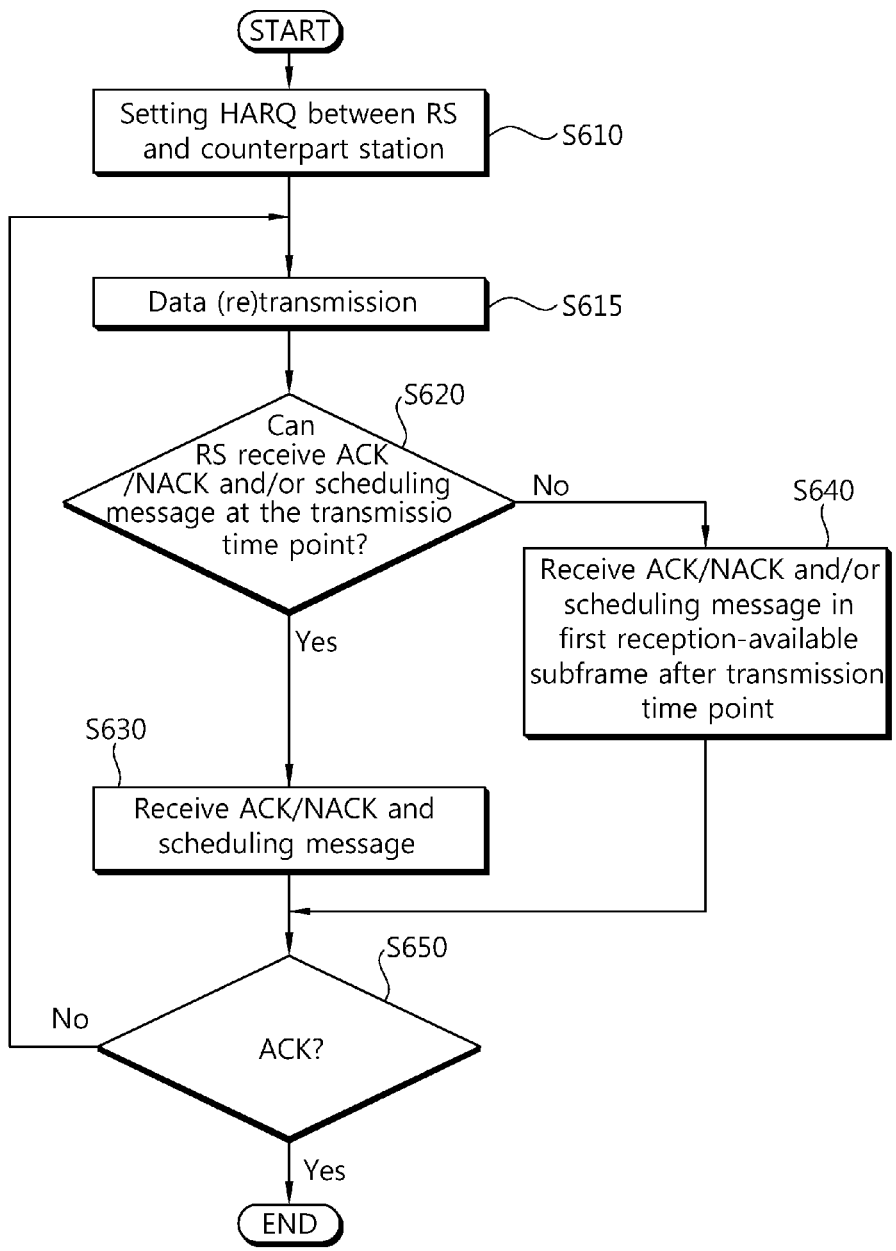
FIG. 6 is a flow chart illustrating the process of an HARQ performing method according to an exemplary embodiment of the present invention.

FIG. 6 is a flow chart illustrating the process of an HARQ performing method according to an exemplary embodiment of the present invention.

With reference to FIG. 6, in step S610, the RS sets an HARQ process with the BS. The BS may inform the RS about a parameter related to the setting of the HARQ process through an upper layer message, e.g., through a radio link control (RRC) message. In this case, the HARQ process may be set as a synchronous HARQ. The HARQ process may be set in the form of HARQ period series (to be described).

In step S620, the RS determines whether or not an ACK/NACK signal could be received in a corresponding subframe.

With respect to each transmission time point, when the RS can receive an ACK/NACK signal at the conventional synchronous ACK time point (after four subframes in case of the 3GPP E-UTRA system), the RS receives an ACK/NACK and/or a scheduling message with respect to a next transmission from the BS in the corresponding subframe (S630). If reception at the conventional synchronous ACK time point is not possible, the RS receives the NACK/NACK and/or the scheduling message from the BS in the first reception-available subframe after the corresponding time point (S640). Accordingly, if the scheduling message is received at a time point which has been delayed compared with the synchronous ACK time point, the corresponding scheduling message is interpreted to be applied to a synchronous retransmission time point of a previous transmission with respect to the BS. If the received signal is NACK, the RS performs the operation again starting from step S615, for a retransmission, whereas if the received signal is ACK, the HARQ performing is terminated (S650). In the following description, the method of regulating a transmission time point according to FIG. 6 is called a <first transmission time point regulation method>.

Figure 7:
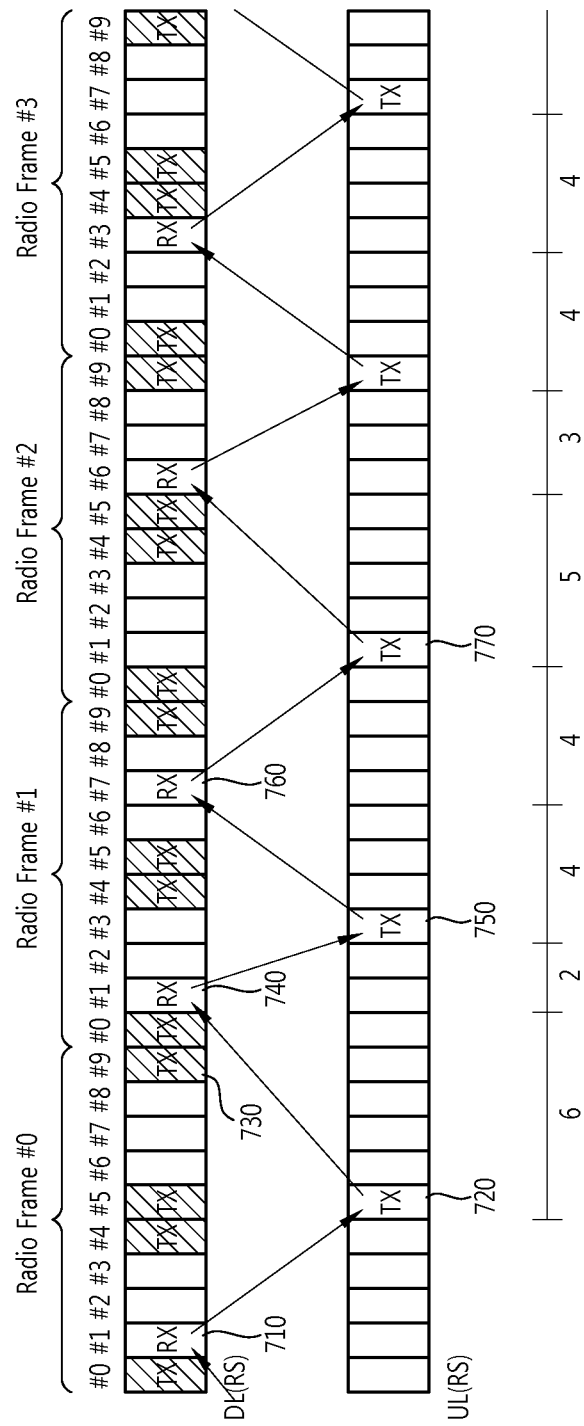
FIG. 7 illustrates performing of HARQ by the 8 sub-frame periods on a relay station-base station link when non-blankable subframes are #0, #4, #5, and #9 according to an exemplary embodiment of the present invention.

FIG. 7 illustrates an HARQ operation according to an exemplary embodiment of the present invention. DL (RS) indicates subframes of the RS at a downlink band, UL (RS) indicates subframes of the RS at an uplink band. The shaded subframes indicate non-blankable subframes. Subframes marked by TXs represent that data or the like is being transmitted in the corresponding subframes, and subframes marked by RXs represent that data or the like is being received in the corresponding subframes. In the following description, subframes #0, #4, #5, and #9 are non-blankable subframes.

With reference to FIG. 7, the RS receives a scheduling message from the BS in a subframe #1 710 of the radio frame #0.

The RS transmits data to the BS in a subframe #5 720 of the radio frame #0. If a transmission time point of an ACK/NACK signal with respect to the data of nth subframe is fixed to come after four subframes (i.e., at (n+4)th subframe), the BS should transmit an ACK/NACK signal in a subframe #9 730 which come after the four subframes of the subframe #5, but at the RS side, the subframe #9 is a non-blankable subframe in which reception of the ACK/NACK signal is not possible. Thus, the BS transmits the corresponding ACK/NACK signal in a subframe #1 740 of the radio frame #1, the nearest subframe available for reception, after the subframe #9 of the radio frame #0. The reason why the transmission time point of the ACK/NACK signal is designated as the nearest subframe following the original subframe #9 is that the transmission time point comes after the subframe #9 to guarantee a minimum time duration for the BS to decode the data received from the RS and the nearest subframe following the subframe #9 is selected as the transmission time point in order to minimize delay caused by it.

Retransmission data with respect to the ACK/NACK signal is transmitted in a subframe #3 750 of the radio frame #1. Accordingly, the ACK/NACK signal is received after six subframes from the initial data, and the retransmission data is transmitted after eight subframes from the initial data. The HARQ period is maintained at the interval of eight subframes.

The BS transmits an ACK/NACK signal with respect to the retransmission data in a subframe #7 760 of the radio frame

1 which comes after four subframes. The RS transmits second retransmission data in a subframe #1 770 of the radio frame #2. Accordingly, the ACK/NACK signal is received after four subframes from the first retransmission data, and the second retransmission data is transmitted after eight subframes from the first retransmission data. The HARQ period is maintained at the interval of eight subframes. Consequently, by regulating the transmission time point of the ACK/NACK signals, HARQ can be performed by the HARQ period set as the interval of eight subframes.

The performing of the above-described HARQ can be represented in the form of series. This is called HARQ period series. In the example illustrated in FIG. 7, the HARQ period series may be represented by [(6, 2), (4, 4), (5, 3), (4, 4), (4, 4)]. (x,y) represents that an ACK/NACK signal with respect to n-th subframe is received in (n+x)-th subframe and retransmission data is transmitted in (n+x+y)-th subframe. The HARQ period is (x+y) subframes. The HARQ periods of the elements belonging to the HARQ period series are all equal. Thus, the HARQ may be performed in a similar manner to the synchronous HARQ, and compatibility with the existing synchronous HARQ can be maintained to its maximum level.

Designation of the HARQ period as the interval of eight subframes is merely illustrative, and there is no limitation in the HARQ period. In addition, the number of elements included in the HARQ period series is illustrated to be 5, but the present invention is not meant to be limited thereto.

Meanwhile, in performing HARQ, a minimum time duration for detecting the presence/absence of a data error and/or a time duration for preparing retransmission data must be guaranteed. For example, it is assumed that an ACK/NACK signal with respect to data of the nth subframe must be transmitted at least in (n+4)-th subframe or in a subframe after the (n+4)-th subframe. Also, it is assumed that in order to prepare retransmission data with respect to an ACK/NACK signal of m-th subframe, it must be transmitted at least in (m+4)-th subframe or in a subframe after the (m+4)-th subframe. In this case, if elements of the HARQ period series are (6, 2), the RS may have insufficient time to prepare retransmission data and fail to transmit retransmission data in the corresponding subframe. Thus, as a solution, the RS may transmit the retransmission data in a subframe corresponding to a next period. For example, with respect to the ACK/NACK signal received in the subframe #1 740 of the radio frame #1, it would be preferred for the RS to transmit retransmission data in the subframe #3 750 of the radio frame #1 according to the elements (6, 2) with respect to the ACK/NACK signal received in the subframe #1 740 of the radio frame #1. However, if time for preparing the retransmission data is insufficient, the RS may transmit the retransmission data at a next transmission time point of the corresponding HARQ, namely, in the subframe #1 770 of the radio frame #2. This transmission method can be applicable for a case where the BS transmits data to the RS. For example, it is assumed that the BS transmits data to the RS in the subframe #1 740 of the radio frame #1. if the RS cannot transmit an ACK/NACK signal with respect to the data in the subframe #3 750 of the radio frame #1, the RS may transmit the corresponding ACK/NACK signal at a next transmission time point of the corresponding HARQ, namely, in the subframe #1 770 of the radio frame #2.

FIGS. 8 and 9 illustrate other examples of performing of HARQ process according to an exemplary embodiment of the present invention. In FIGS. 8 and 9, DL (RS) indicates subframes of the RS at the downlink band, and UL (RS) indicates subframes of the RS at the uplink band. Shaded subframes represent non-blankable subframes. Subframes marked by TXs indicate that data or the like is being transmitted in the corresponding subframes, and subframes marked by RXs indicate that data is being received in the corresponding subframes. The eight processes in FIGS. 8 and 9 show the HARQ operation according to locations of subframes at an early stage in which initial data is transmitted within the radio frames based on the embodiment illustrated in FIG. 7.

Table 1 below shows the HARQ period series of each HARQ process in the embodiments in FIGS. 8 and 9.

TABLE 1

| Process | HARQ period series |
| --- | --- |
| Process (A) | [(6, 2), (4, 4), (5, 3), (4, 4), (4, 4)] |
| Process (B) | [(5, 3), (4, 4), (4, 4), (6, 2), (4, 4)] |
| Process (C) | [(4, 4), (6, 2), (4, 4), (5, 3), (4, 4)] |
| Process (D) | [(4, 4), (5, 3), (4, 4), (4, 4), (6, 2)] |
| Process (E) | [(4, 4), (4, 4), (6, 2), (4, 4), (5, 3)] |
| Process (F) | [(6, 2), (4, 4), (5, 3), (4, 4), (4, 4)] |
| Process (G) | [(5, 3), (4, 4), (4, 4), (6, 2), (4, 4)] |
| Process (H) | [(4, 4), (6, 2), (4, 4), (5, 3), (4, 4)] |

As noted from Table 1, the HARQ period series of each process appear as a cyclic shift of the HARQ period series [(6, 2), (4, 4), (5, 3), (4, 4), (4, 4)] of the embodiment illustrated in FIG. 7 according to the initial locations of the subframes.

In the above-described embodiments, the subframes #0, #4, #5, and #9 are defined as non-blankable subframes, but the locations or the number of non-blankable subframes may be altered.

Figure 10:
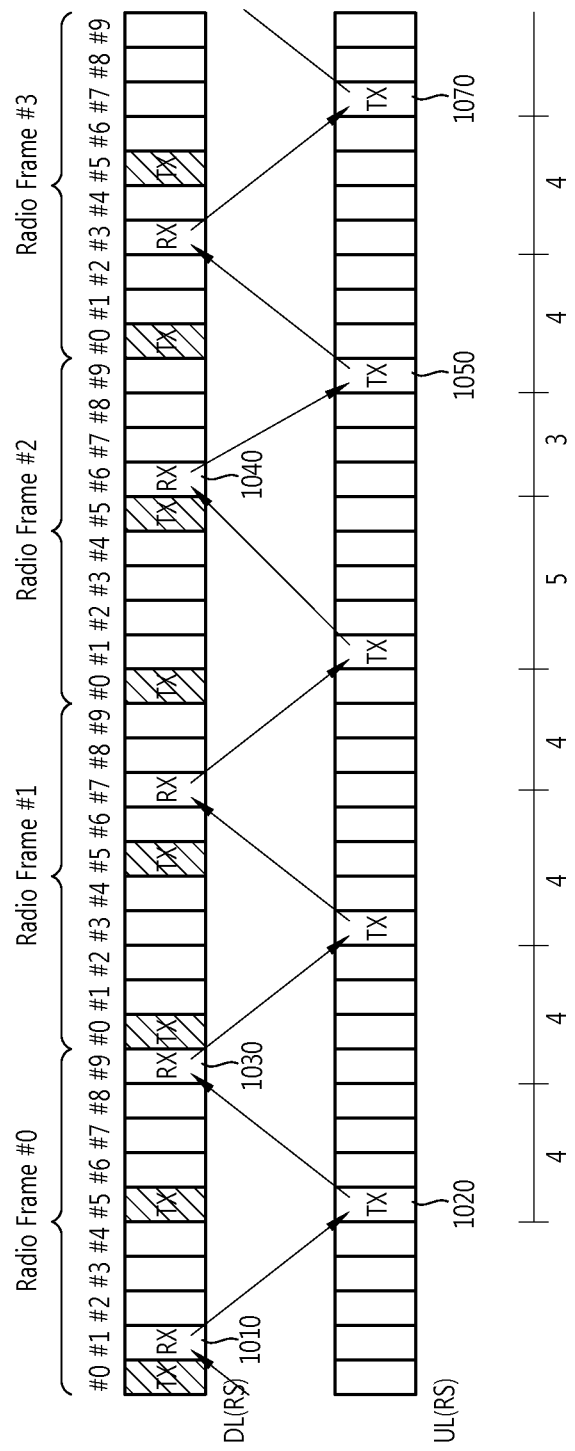
FIG. 10 illustrates performing of HARQ by the 8 sub-frame periods on the relay station-base station link when non-blankable subframes are #0 and #5 according to an exemplary embodiment of the present invention.

FIG. 10 illustrates performing of HARQ when the subframes #0 and #5 are non-blankable subframes according to an exemplary embodiment of the present invention. DL (RS) indicates subframes of the RS at the downlink band, and UL (RS) indicates subframes of the RS at the uplink band. Shaded subframes represent non-blankable subframes. Subframes marked by TXs indicate that data or the like is being transmitted in the corresponding subframes, and subframes marked by RXs indicate that data is being received in the corresponding subframes.

With reference to FIG. 10, first, the RS receives a signal from the BS in a subframe #1 1010 of a radio frame #0, and receives scheduling information. The RS transmits a signal to the BS in a subframe #5 1020 which comes after four subframes. A synchronous ACK is applied to an ACK with respect to the transmission signal, so it the ACK is received in a subframe #9 1030 which comes after four subframes. This is, because, unlike the case illustrated in FIG. 7, the subframe #9 1030 can be a blank subframe. In a subframe #6 1040 of a radio frame #2, an ACK with respect to data before five subframes is transmitted and a scheduling message with respect to a transmission after three subframes is transmitted. In the example of FIG. 10, the HARQ period series appear as [(4, 4), (4, 4), (5, 3), (4, 4), (4, 4)]. Compared with the case illustrated in FIG. 7, the subframes #4 and #9 can be used, so the element (6,2) of the HARQ period series disappears.

Figure 11:
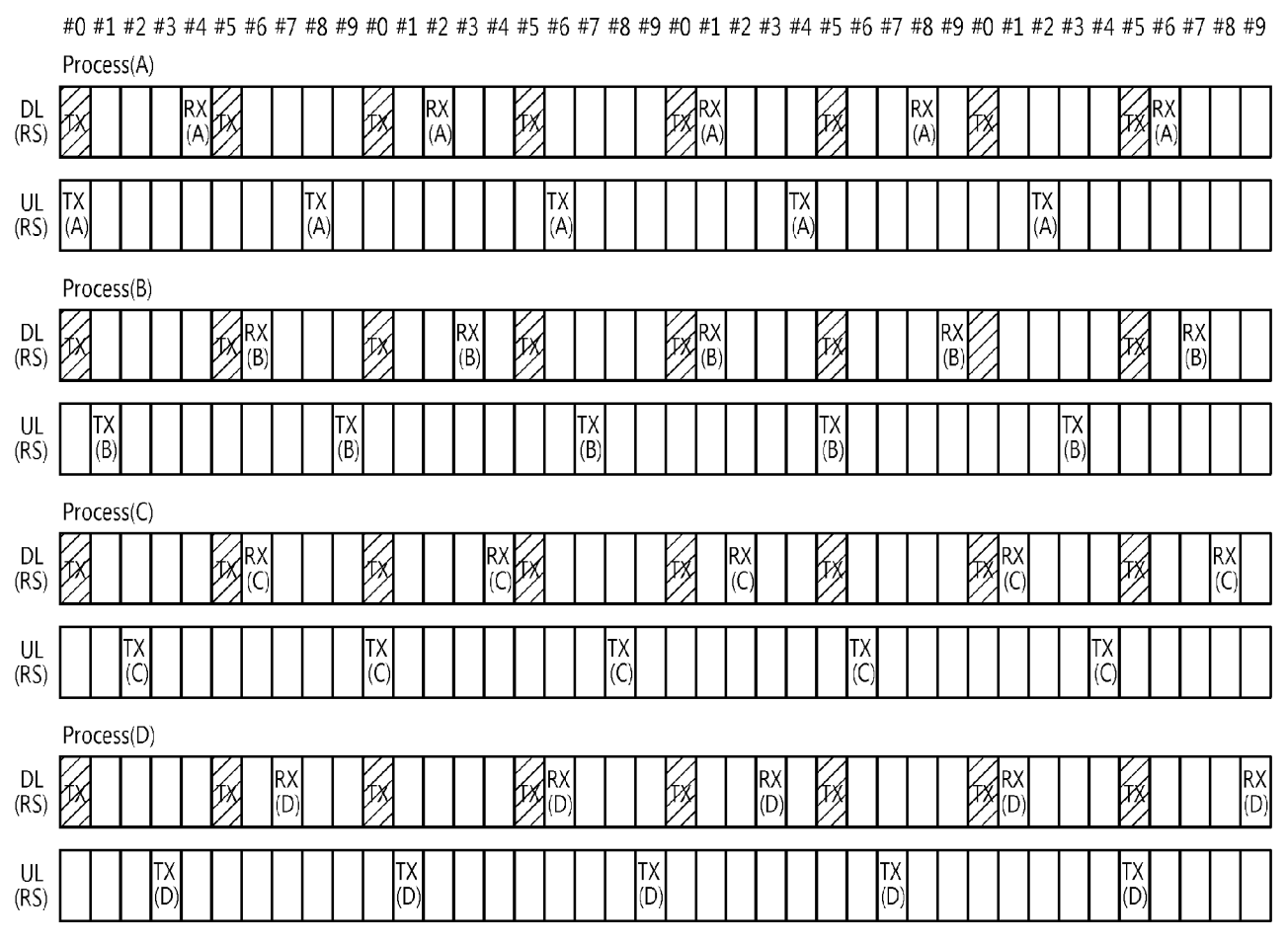
Figure 12:
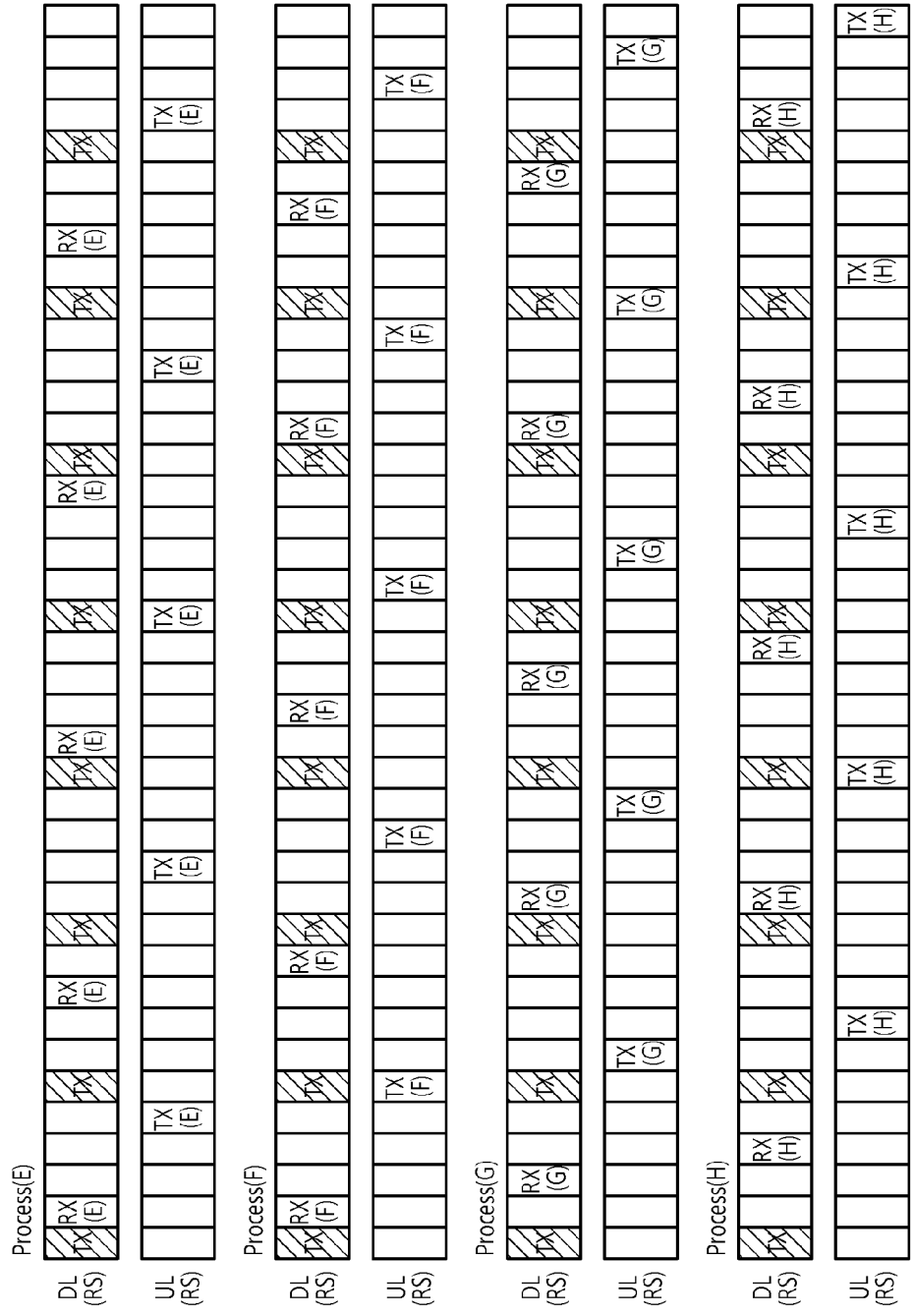
FIG. 12 illustrates the types of HARQ processes defined in FIG. 10.

FIGS. 11 and 12 show eight HARQ processes generated according to the <first transmission time regulation method> when the non-blankable subframes are #0 and #5 like the case illustrated FIG. 10. In FIG. FIGS. 11 and 12, DL (RS) indicates subframes of the RS at the downlink band, and UL (RS) indicates subframes of the RS at the uplink band. Shaded subframes represent non-blankable subframes. Subframes marked by TXs indicate that data or the like is being transmitted in the corresponding subframes, and subframes marked by RXs indicate that data is being received in the corresponding subframes.

Table 2 below shows the HARQ period series of each HARQ process in the embodiments in FIGS. 11 and 12.

TABLE 2

| Process | HARQ period series |
| --- | --- |
| Process (A) | [(4, 4), (4, 4), (5, 3), (4, 4), (4, 4)] |
| Process (B) | [(5, 3), (4, 4), (4, 4), (4, 4), (4, 4)] |
| Process (C) | [(4, 4), (4, 4), (4, 4), (5, 3), (4, 4)] |
| Process (D) | [(4, 4), (5, 3), (4, 4), (4, 4), (6, 2)] |
| Process (E) | [(4, 4), (4, 4), (4, 4), (4, 4), (5, 3)] |
| Process (F) | [(4, 4), (4, 4), (5, 3), (4, 4), (4, 4)] |
| Process (G) | [(5, 3), (4, 4), (4, 4), (6, 2), (4, 4)] |
| Process (H) | [(4, 4), (4, 4), (4, 4), (5, 3), (4, 4)] |

In Table 2, the HARQ period series of every process appear as a cyclic shift of [(4, 4), (4, 4), (5, 3), (4, 4), (4, 4)] of FIG. 10.

In the example illustrated in FIG. 10, in order to secure a time required for channel decoding in the RS also with respect to data transmitted in the subframe #6 of the radio frame #2 having the element (5, 3) of the HARQ period series, like the example of FIG. 7, an ACK/NACK signal with respect to the corresponding data may not be transmitted in a subframe #9 1050 of the radio frame #2 but be transmitted in a subframe #7 1070 of a radio frame #3.

The processes illustrated in FIGS. 8 and 9 or 11 and 12 may be modified. No matter which HARQ process it is, so long as the sum of the numbers in the parenthesis of the HARQ period series is 8, the RS can perform retransmission of period the interval of 8 subframe. For example, it may be possible to configure an HARQ process based on the HARQ period series of [(6, 2), (5, 3), (5, 3), (4, 4), (4, 4)]. However, because it does not follow the <first transmission time regulation method>, an ACK delay of one subframe occurs unnecessarily, so it is ineffective.

The exemplary embodiment of the present invention can be applicable for a case where a single RS has two or more HARQ processes.

Figure 13:
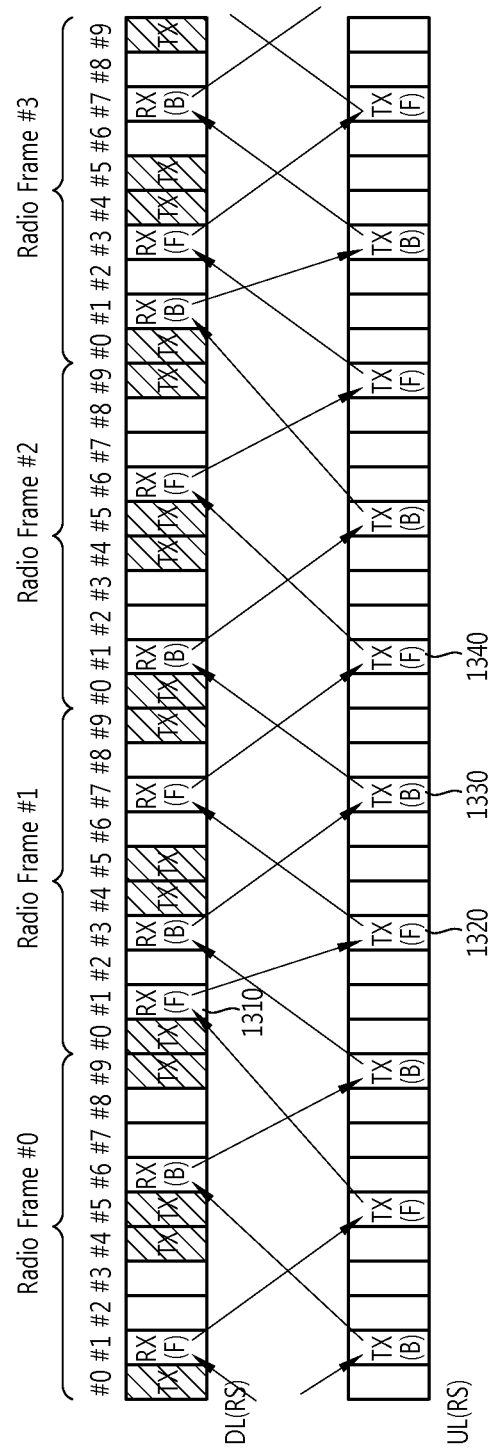
FIG. 13 illustrates an example of using two HARQ processes in which reception band subframes from a base station are not overlapped.

FIG. 13 illustrates a method of performing two HARQ processes such that reception band subframes from the BS do not overlap in the two HARQ processes. In FIG. 13, DL (RS) indicates subframes of the RS at the downlink band, and UL (RS) indicates subframes of the RS at the uplink band. Shaded subframes represent non-blankable subframes. Subframes marked by TXs indicate that data or the like is being transmitted in the corresponding subframes, and subframes marked by RXs indicate that data is being received in the corresponding subframes. Specifically, FIG. 13 shows, for example, the case where the process (B) of FIG. 8 and the process (F) of FIG. 9 are simultaneously performed.

The BS and the RS may simultaneously use two or more HARQ processes each having the mutually overlapping subframes among the HARQ processes as shown in FIGS. 8 and 9 or FIGS. 11 and 12. In this case, reception subframes from the BS may be sequentially used one process by one process, for which, a rule may be regulated such that the reception subframes do not overlap with each other. In this case, the RS cannot perform reception at the synchronous ACK time point according to the <first transmission time point regulation method>, which includes a case where there is a reception subframe from the BS of the previously used HARQ process. Namely, a subframe which is first available for reception is determined as an initial subframe which does not correspond to a non-blankable subframe and a subframe used for other HARQ currently being used at the transmission time point. Hereinafter, the transmission time point regulation method obtained by modifying the <first transmission time point regulation method> will be referred to as a <second transmission time point regulation method>.

Figure 14:
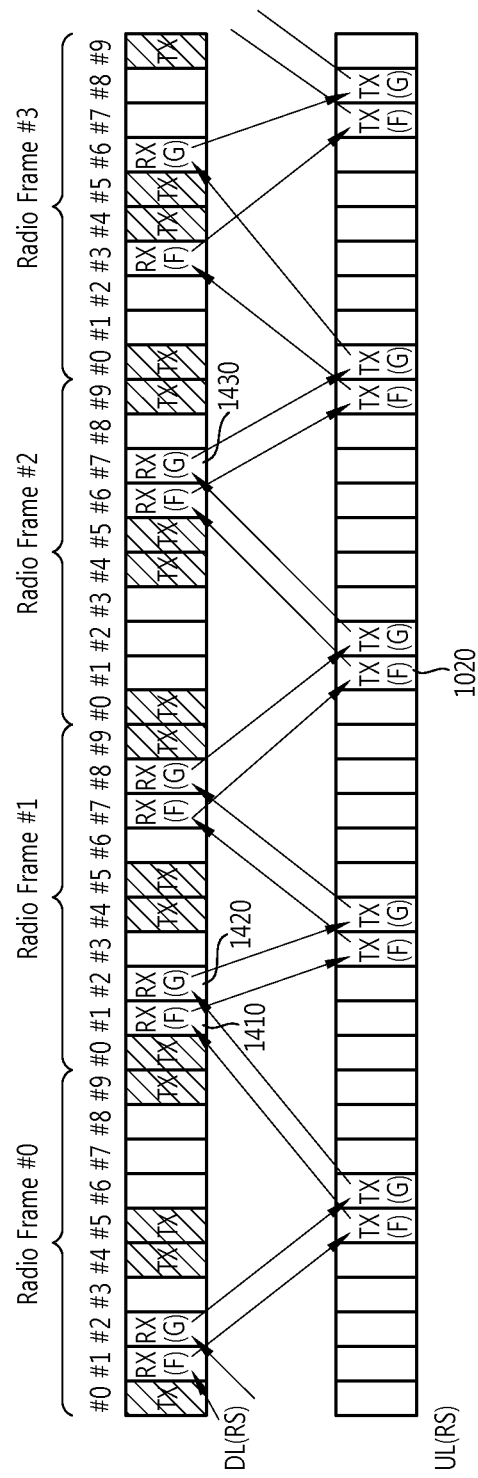
FIG. 14 illustrates an example of sequentially setting and using two HARQ processes with reception band subframes from a base station which are not overlapped.

FIG. 14 illustrates an example of using two HARQ processes together according to the <second transmission time point regulation method>. In FIG. 14, DL (RS) indicates subframes of the RS at the downlink band, and UL (RS) indicates subframes of the RS at the uplink band. Shaded subframes represent non-blankable subframes. Subframes marked by TXs indicate that data or the like is being transmitted in the corresponding subframes, and subframes marked by RXs indicate that data is being received in the corresponding subframes.

In FIG. 14, the HARQ process (F) of FIG. 9 is first set, and the HARQ process (G) of FIG. 9 is then set. In the HARQ process (G), the reception subframes are set to be different from those as shown in FIG. 9 due to reception subframes used by the first set process. That is, the case where the elements of the HARQ period series deviate from (4, 4) increases. For example, in case of the radio frame #1, the process (G) is set to be received in a subframe #1 1410 in FIG. 9. In this case, however, because the corresponding subframe has been occupied by the previously used process (F), the process (G) is set to be received in a subframe #2 1420 in order to avoid the overlap. In this case, the element of the HARQ period series is changed from (5, 3) in FIGS. 8 and 9 to (6, 2). A similar operation is performed in the subframe #7 1430 of the radio frame #2. The BS and the RS may allocate the later set process such as the process (G) in FIG. 14 to traffic with a relatively low latency requirement or lower priority level.

Figure 15:
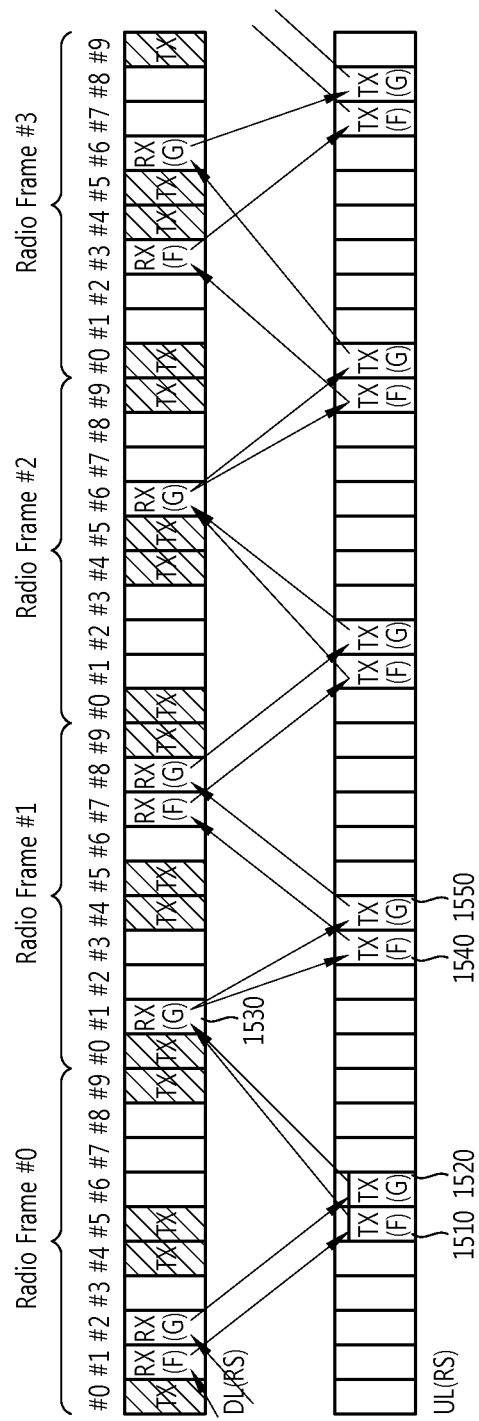
FIG. 15 illustrates an example of using two HARQ processes by permitting overlap of reception band subframes from a base station.

FIG. 15 illustrates an example of performing HARQ processes when overlap of reception subframes of each HARQ process is permitted. In FIG. 15, DL (RS) indicates subframes of the RS at the downlink band, and UL (RS) indicates subframes of the RS at the uplink band. Shaded subframes represent non-blankable subframes. Subframes marked by TXs indicate that data or the like is being transmitted in the corresponding subframes, and subframes marked by RXs indicate that data is being received in the corresponding subframes.

In the case illustrated in FIG. 15, the <first transmission time point regulation method> is employed as it is, and the resultant HARQ processes are irrelevant to a set order. When reception subframes of two or more processes overlap, the corresponding subframes can transfer an ACK/NACK signal and/or a scheduling message of all the overlapping processes. In case of a subframe #1 1530 of the radio frame #1, the reception subframes of the two processes overlap. An ACK/NACK signal with respect to the transmission of the respective processes to the BS in the overlapping subframes (i.e., the transmission in a subframe #5 1510 of the radio frame #0 of the process (F) and the transmission in a subframe #6 1520 of the radio frame #0 of the process (G)) and/or a scheduling message with respect to the next transmission of the respective processes to the BS (i.e., the transmission in a subframe #3 1540 of the radio frame #1 of the process (F) and the transmission in a subframe #4 1550 of the radio frame #1 of the process (G)). As a result, it features that ACKs with respect to transmissions from the RS to the BS made at two different transmission time points may be transmitted at the same time point, or scheduling messages with respect to transmissions to the BS at two different transmission time points may be transmitted at the same time point.

As for a transmission time point of an ACK with respect to data received by the RS, if two or more HARQ processes are used, the RS may transmit the ACK by using a transmission time point of another process. For example, in the case illustrated in FIG. 13, if the RS cannot transmit an ACK/NACK signal with respect to the data, which have been received in a subframe #1 1310 of the radio frame #1, in a subframe #3 1320 of the radio frame #1, namely, a transmission time point following the corresponding process, the RS may transmit a subframe #1 1340 of the radio frame #2, namely, the next transmission time point of the same HARQ process as mentioned above. Alternatively, the RS may transmit the ACK/NACK signal in a subframe #7 1330 of the radio frame #1, namely, the nearest transmission time point among the transmission time points including those of the other process. In this case, information regarding to which process the ACK belongs is required in the ACK information.

The RS sets the HARQ process according to one of those methods as described above or any of their combinations for its communication with the BS. The BS may inform the RS about a parameter related to the setting of the HARQ process through an upper layer message, for example, through an RRC message. For example, the RS may perform communication with the BS by using one or more HARQ processes semi-statically. In this case, the BS may change the amount, location, modulation scheme, and a coding scheme of resources used by the RS at each subframe through a scheduling message. The RS may allocate an HARQ process which is not used for its communication with the BS to the MS connected thereto to thereby perform communication with the MS without a collision. In addition, the RS and the BS may fix the amount and location of the radio resources within the semi-statically used HARQ(s) like semi-persistent scheduling. In this case, the BS does not transmit scheduling information with respect to the RS at every subframe, but transmits only ACK/NACK with respect to data the RS has transmitted, and data. In this case, the BS transmits a corresponding message only when the type of a semi-statically allocated HARQ process or the amount and location of radio resources within a particular HARQ process change.

Figure 16:
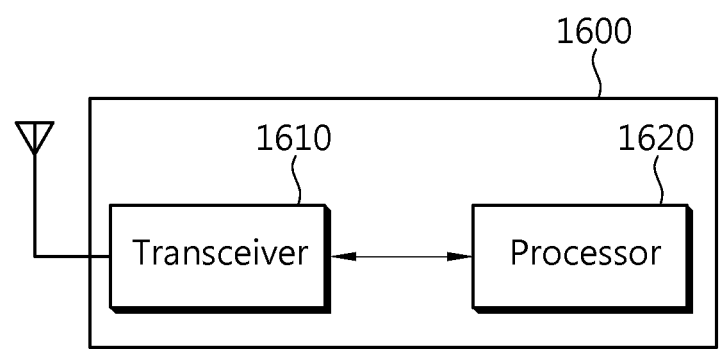
FIG. 16 is a schematic block diagram of a relay station according to an exemplary embodiment of the present invention.

FIG. 16 is a schematic block diagram of an RS according to an exemplary embodiment of the present invention. The RS 1600 includes a transceiver 1610 and a processor 1620. The transceiver 1610 receives data from a BS (or an MS) and relays the data to the MS (or the BS). The processor 1620 is connected with the transceiver 1610 and serves to process the data received from the transceiver 1610 and relay it. The HARQ performing as shown in FIGS. 6 to 19 may be implemented by the processor 1620.

The methods as described above can be implemented by processors such as a micro-processor, a controller a microcontroller, an application specific integrated circuit (ASIC), and the like, according to software coded to perform the methods or program codes. It will be understood that designing, developing, and implementing the codes may be obvious to the skilled person in the art based on the description of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method for performing a hybrid automatic repeat request (HARQ) in a wireless communication system, the method comprising:
receiving, by a relay station (RS) from a base station (BS), information to determine a plurality of allocated downlink (DL) subframes which are used by the RS to receive scheduling information from the BS;
determining, by the RS based on the received information, a plurality of uplink (UL) subframes for performing a HARQ with the plurality of allocated DL subframes, each of the plurality of UL subframes corresponding to each of the plurality of allocated DL subframes,
assigning, by the RS, sequentially each of a plurality of HARQ processes to each of the plurality of UL subframes one by one; and
performing, by the RS, HARQ with the BS at least one of the plurality of HARQ processes assigned to the plurality of UL subframes,
wherein a n-th subframe is configured for a corresponding UL subframe if (n−4)-th subframe is configured for one of the plurality of allocated DL subframes, where n denotes an integer,
wherein a number of the plurality of HARQ processes is equal to a number of the plurality of UL subframes,
wherein the plurality of allocated DL subframes are configured in at least one radio frame having 10 subframes indexed from 0 to 9, and
wherein subframes of the 10 subframes having indexes 0, 4, 5 and 9 are not configured as an allocated DL subframe.

2. The method of claim 1, further comprising:
receiving information on the number of the plurality of HARQ processes from the BS.

3. The method of claim 1, wherein the number of the plurality of HARQ processes is not greater than eight.

4. A relay station (RS) configured for performing a hybrid automatic repeat request (HARQ) in a wireless communication system, the RS comprising:
a transceiver configured to transmit or receive a radio signal; and
a processor operatively coupled with the transceiver and configured to:
receive, from a base station (BS), information to determine a plurality of allocated downlink (DL) subframes which are used by the RS to receive scheduling information from the BS;
determine, based on the received information, a plurality of uplink (UL) subframes for performing a HARQ with the plurality of allocated DL subframes, each of the plurality of UL subframes corresponding to each of the plurality of allocated DL subframes,
assign sequentially each of a plurality of HARQ processes to each of the plurality of UL subframes one by one; and
perform HARQ with the BS at least one of the plurality of HARQ processes assigned to the plurality of UL subframes,
wherein a n-th subframe is configured for a corresponding UL subframe if (n−4)-th subframe is configured for one of the plurality of allocated DL subframes, where n denotes an integer,
wherein a number of the plurality of HARQ processes is equal to a number of the plurality of UL subframes,
wherein the plurality of allocated DL subframes are configured in at least one radio frame having 10 subframes indexed from 0 to 9, and
wherein subframes of the 10 subframes having indexes 0, 4, 5 and 9 are not configured as an allocated DL subframe.

5. The RS of claim 4, wherein the processor is configured to receive information on the number of the plurality of HARQ processes from the BS.

6. The RS of claim 4, wherein the number of the plurality of HARQ processes is not greater than eight.

* * * * *